April 9, 1968

R. H. MacKAY 3,376,758

DRIVE FOR ROTATING DRUM

Filed Oct. 24, 1966

INVENTOR.
Robert H. MacKay

BY
*Jeffers and Young*
ATTORNEYS

April 9, 1968

R. H. MacKAY 3,376,758

DRIVE FOR ROTATING DRUM

Filed Oct. 24, 1966

INVENTOR.
Robert H. MacKay

BY

*Jeffers and Young*

ATTORNEYS

United States Patent Office 3,376,758
Patented Apr. 9, 1968

3,376,758
DRIVE FOR ROTATING DRUM
Robert H. MacKay, Fort Wayne, Ind., assignor to Lincoln Manufacturing Company, Inc., Fort Wayne, Ind., a corporation of Indiana
Filed Oct. 24, 1966, Ser. No. 588,793
4 Claims. (Cl. 74—421)

My invention relates to an improved drive arrangement for a rotating drum or roller, and particularly to such a drive arrangement that has a relatively small size and relatively high torque.

Rotating drums are frequently used to drive and support a belt or endless belt conveyor, which in turn is used to transport materials or articles from one location to another. One or more of the drums is powered or driven so as to move the belt at the desired speed. Previously, the power or drive for the one or more powered or driven drums has been provided by external connections and mechanisms. For example, an electric motor or other source of power has been connected to one or more drums by sprockets and chain belts, or by pulleys and belts. Such connections and mechanisms add to the size and weight of the conveyor drive. This is particularly true where the conveyors are relatively small and are used to transport relatively light objects, such as trays of food in a hospital kitchen. These connections and mechanisms may not provide a relatively efficient torque or drive. They are a hazard to personnel, and are subject to stoppage and damage resulting from foreign objects and dirt getting in them. And, they are difficult to keep clean, particularly where they are lubricated with oil or grease.

Accordingly, an object of my invention is to provide an improved drive for a rotating drum.

Another object of my invention is to provide a rotating drum drive arrangement that has no external drive mechanisms.

Another object of my invention is to provide a rotating drum drive arrangement, particularly for a belt conveyor, that presents relatively litttle hazard to personnel.

Another object of my invention is to provide a rotating drum drive arrangement that is self-contained, and hence less subject to stoppage, damage, and contamination.

In a rotating drum drive arrangement having no external drive mechanisms, the needed motor size and mechanical rigidity may make the drive arrangement excessively large. In order that the internal drive construction may be relatively simple, the rotational output of the motor is derived at only one end. An output derived at only one end results in the motor being larger than actually necessary in order to provide the requisite torque, a construction that is wasteful of space and electrical power. In addition, many electric motors operate most efficiently at a relatively high speed of rotation, and a speed-reducing gear arrangement may be desirable or necessary to provide the desired rotational speed for the drum. This speed-reducing gear arrangement requires further space. Thus, the relatively large electric motor and the speed-reducing gear arrangement require a structure which, while self-contained, may be larger than desirable.

Accordingly, another object of my invention is to provide an improved rotating drum drive arrangement that has an electric motor therein which is of a relatively efficient and small size.

Another object of my invention is to provide a self-contained rotating drum drive arrangement having an electric motor and a speed-reducing gear arrangement which require a relatively small space.

Another object of my invention is to provide a rotating drum drive arrangement which efficiently utilizes the output torque from the electric motor by a mechanically strong but relatively small structure.

Briefly, these and other objects are achieved in accordance with my invention by an electric motor having a gear structure with speed-reducing gears fastened to one end of the motor. The speed-reducing gears are driven by the motor and have an output shaft. A plurality of support rods are fastened to the gear structure and extend therefrom along the motor so that the other ends of the support rods are positioned beyond the other end of the motor. A first mounting member is fastened to the other ends of the support rods so as to rigidly hold the motor and gear structure with respect to the first mounting member. A second mounting member is provided adjacent the output shaft of the speed-reducing gears. Each of the mounting members includes a mounting shaft extending in opposite directions from the motor along a common axis. First and second end plates are respectively mounted for rotation on the first and second mounting shafts. A conveyor drum is concentrically positioned around and fastened to the first and second end plates. Drive gears are operatively connected between the output shaft of the speed-reducing gears and the second end plate so that as the motor rotates, the speed-reducing gears turn the drive gears, which in turn drive the conveyor drum. The drive gears also provide added support between the motor and gear structure and the second mounting member. Thus, I provide a small, self-contained structure which provides an improved drive for the drum. My structure, particularly the support rods and drive gears, permits rigid mounting of the motor so that the motor may be of a relatively small size because its torque is efficiently utilized.

The subject matter which I regard as my invention is particularly pointed out and distinctly claimed in the claims. The structure and operation of my invention, together with further objects and advantages, may be better understood from the following description given in connection with the accompanying drawing, in which:

Figure 1:
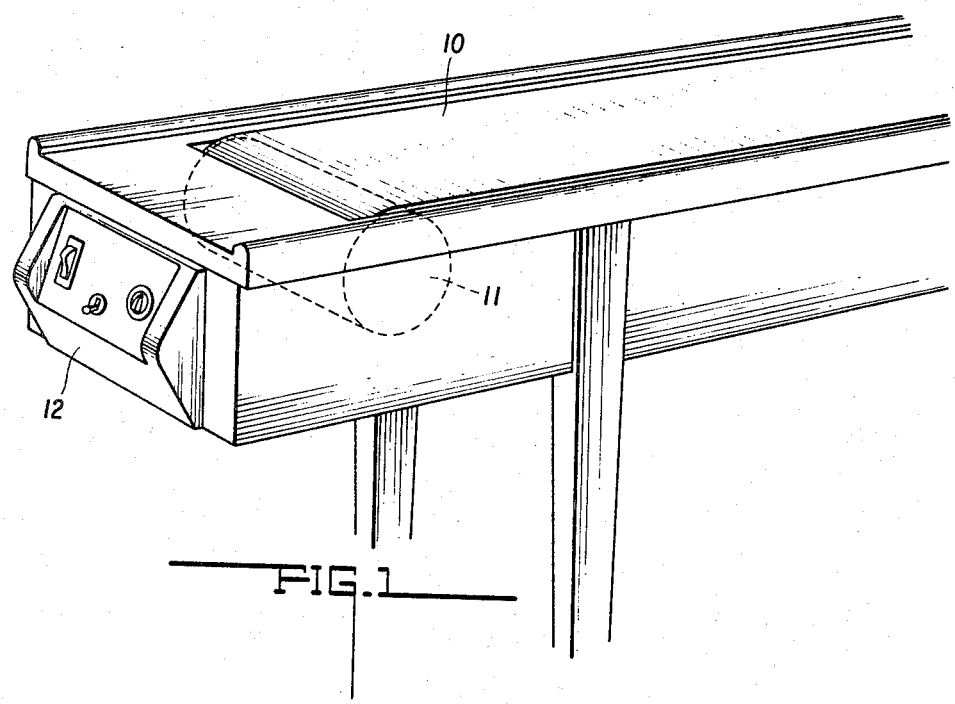
FIGURE 1 shows a perspective view of an endless belt conveyor utilizing a drive arrangement in accordance with my invention.
Figure 2:
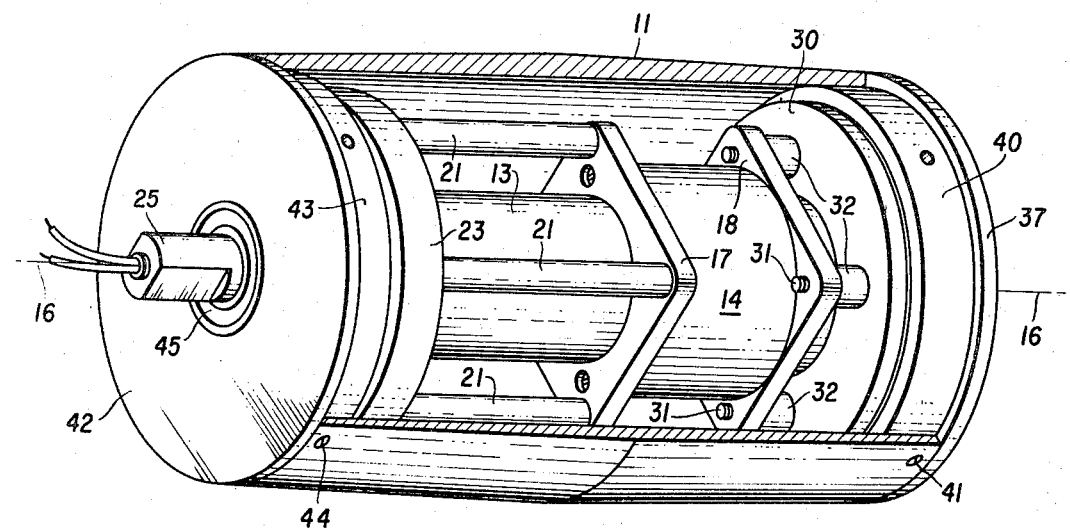
FIGURE 2 shows an isometric view, with a portion of the drum broken away, of a drive arrangement in accordance with my invention.
Figure 3:
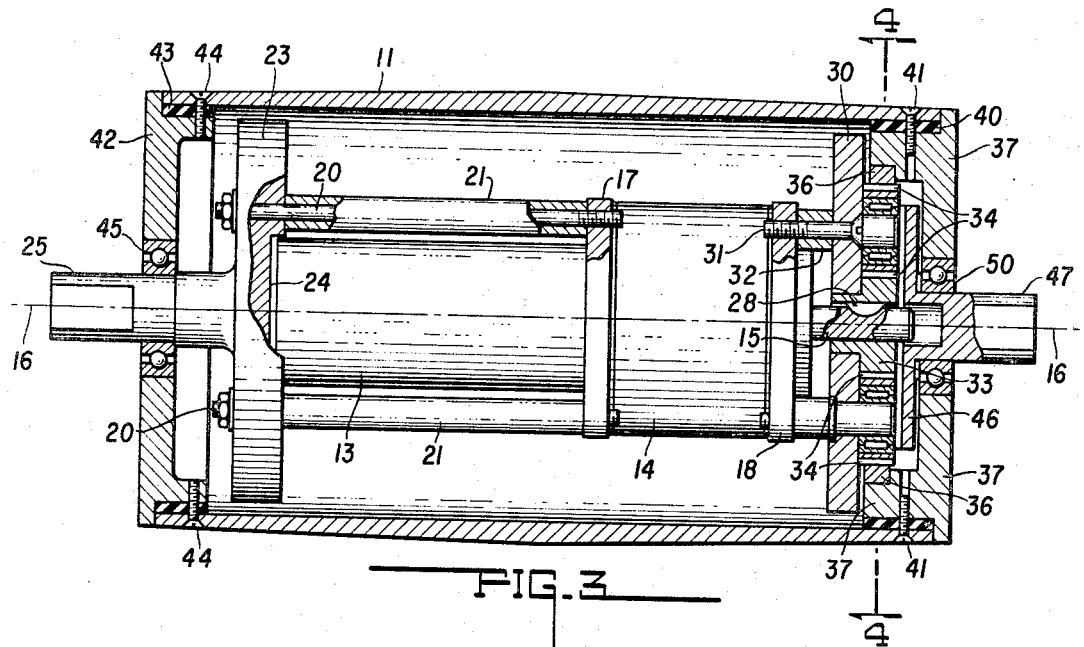
FIGURE 3 shows a longitudinal sectional view of the drive arrangement.
Figure 4:
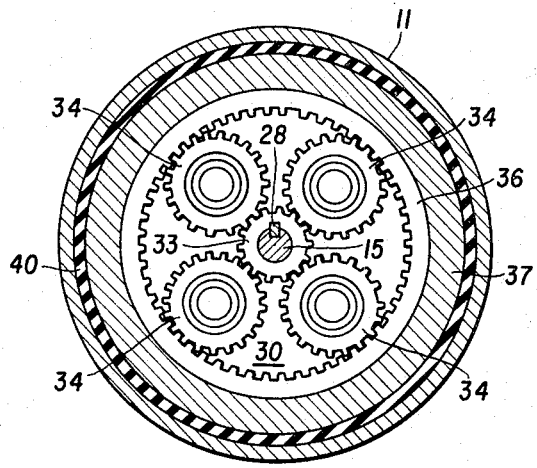
FIGURE 4 shows a transverse sectional view taken along the line 4—4 of FIGURE 3.

The conveyor shown in the perspective view of FIGURE 1 is a typical embodiment with which the drive arrangement of my invention can be used. The conveyor of FIGURE 1 comprises a belt or endless belt 10 which is mounted on and rotated by a number of cylindrical drums or rollers. One drum or roller 11 is indicated in FIGURE 1. The speed and operation of the conveyor belt 10 and the drum or roller 11 may be controlled by a suitable control panel 12. It is to be understood that the arrangement shown in FIGURE 1 is by way of example only, and that the drive arrangement of my invention may be used in many applications. FIGURE 2 shows an isometric view of the drive arrangement contained within the drum 11. FIGURE 3 shows a longitudinal sectional view of the drive arrangement contained within the drum 11, and FIGURE 4 shows a transverse sectional view along the line 4—4 of FIGURE 3. The drum 11 and the various parts contained in the drum 11 are preferably positioned in a symmetrical manner transversely about the main longitudinal axis 16 of the drive arrangement. The drive arrangement includes an electric motor 13, which is usually an elongated cylindrical structure. A speed-reducing gear arrangement or structure 14 is positioned at one end of the motor 13. This speed-reducing gear structure 14 may comprise a gear train having its input gear coupled to the output shaft of the motor 13, and an output shaft 15 extending in a direction away from the motor 13 and the gear structure 14. The gear structure 14 includes first and second plates 17, 18 which are rigidly fastened to the gear structure 14. The first plate 17 is also rigidly fastened to the one end of the motor 13 so that the gear train within the gear structure 14 receives substantially all of the torque from the motor 13. A plurality of mounting rods or members 20 with spacers 21 extend from the first plate 17 along the motor 13, and extend beyond the other end of the motor 13. These rods 20 are threaded at their ends for direct attachment to the first plate 17 and for attachment with nuts to a first mounting member 23 at the outer ends of the rods 20. As shown in FIGURE 3, the first mounting member 23 is provided with a depression 24 so that it can be spaced from the motor 13 and still occupy a small space. The first mounting member 23 includes a first mounting shaft 25 which is positioned on the longitudinal axis of the structure and extends away from the motor 13. The first mounting shaft 25 may have one or more flat surfaces to permit the first mounting shaft 25 to be rigidly mounted against rotation. Also, the first mounting shaft 25 may have an opening therethrough to permit wires or leads from the motor 13 to be brought to the outside of the drive arrangement as shown in FIGURE 2.

Adjacent the second plate 18 is a gear plate 30 which is rigidly fastened to the second plate 18 by a plurality of suitable bolts 31 and spacers 32. It is preferred that these bolts 31 and spacers 32 be symmetrically positioned about the longitudinal axis 16 of the structure. The gear plate 30 is preferably circular in shape and has a central opening therethrough which permits the output shaft 15 to pass therethrough. A central drive gear 33 is fastened for rotation on the output shaft 15 by a key 28. This central drive gear 33 is positioned on the outer side of the gear plate 30. A bearing (not shown) may be provided between the central drive gear 33 and the gear plate 30. A plurality (four are shown) of idler gears 34 are mounted on the outer side of the gear plate 30 for rotation with respect to the gear plate 30. These idler gears 34 are preferably symmetrically positioned about the axis 16, and engage or mesh with the central drive gear 33. Thus, as the output shaft 15 rotates, the central drive gear 33 drives the idler gears 34. A ring gear 36, having internal teeth shaped to mesh or conform with the idler gears 34, is symmetrically positioned around and supported by the idler gears 34, and engages or meshes with these idler gears 34. Thus, the output shaft 15 drives the central drive gear 33, which in turn drives the idler gears 34, which in turn drive the ring gear 36. The ring gear is rigidly attached to the inner circumference of a second circular end plate 37. This second end plate 37 supports one end of the drum or roller 11 through its flange and an annular ring or washer 40. The drum 11 is attached to the second end plate 37 by a plurality of suitable screws or bolts 41. The second end plate 37 is supported for rotation on a second mounting member 46 through a bearing structure 50. The second mounting member 46 also has a mounting shaft 47 which may be provided with a flat surface or surfaces to secure the second mounting member 46 against rotation.

At the other end of the structure, the drum 11 is supported by a first circular end plate 42. The drum 11 is attached through a ring or washer 43 by screws or bolts 44 to the flange of the first end plate 42. The first end plate 42 is supported for rotation on the first mounting member 23 through a bearing structure 45.

It will thus be seen that rotation of the electric motor 13 causes the output shaft 15 of the gear structure 14 to rotate. This rotation of the output shaft 15 causes the idler gears 34 and the ring gear 36 to rotate. Rotation of the ring gear 36 causes rotation of the second end plate 37. This second end plate 37 causes rotation of the drum 11. The drum 11 is supported on the mounting shafts 25, 47 by the first and second end plates 42, 37 and the bearings 45, 50. The motor 13 and the gear structure 14 are supported and held by the first mounting member 23. The gear structure 14 is further supported by the second mounting member 46 through the gears 34, 37, the second end plate 37, and the bearing 50. And, both the mounting shafts 25, 47 of the mounting members 23, 46 respectively support the drum 11 for rotation.

The structure as described and shown permits a relatively small electric motor, such as a direct current motor, to be utilized, since the support rods or members 20 rigidly support the motor against its torque. This arrangement permits a relatively small direct current motor to be used. Such a motor normally operates at relatively high speeds, but this arrangement permits a reducing-gear structure to be used to reduce the motor speed to any suitable magnitude for the drum. And, at the same time, the structure is relatively small. This is because the motor may be relatively small but all of its torque can be utilized through the gear structure 14 by being rigidly mounted against vibration and motion. The structure is contained within the drum 11 whose ends are sealed or closed by the close fit between the drum 11 and the end plates 37, 42.

It will thus be seen that the drive arrangement in accordance with my invention provides a new and improved structure for transmitting power from an electric motor to a drum or similar structure surrounding the motor. This drive arrangement is an improvement over previously known devices in that it is self-contained and in that a motor and speed-reducing gear structure may be utilized. The arrangement provides improved torque characteristics, since the motor is rigidly mounted. Persons skilled in the art will appreciate that modifications may be made to the drive arrangement. For example, more or less mounting rods 20 may be used, and more or less idler gears 34 may be used. The gear structure 14 may comprise any type of gear speed-reducing arrangement that is desired. The mounting shafts 25, 47 may have any configuration for being attached to a stationary object. And the end plates 37, 42 may have any suitable sealing configuration. Therefore, while my invention has been described with reference to a particular embodiment, it is to be understood that modification may be made without departing from the spirit of the invention or from the scope of the claims.

What I claim as new and desire to secure by Letters Patent of the United States is:

1. A drive arrangement for a conveyor or the like, comprising:
   (a) an elongated electric motor having a drive shaft at one end;
   (b) a plate structure fastened to said one end of said motor, said plate structure having a portion extending beyond the outside of said motor;
   (c) a plurality of elongated support elements each fastened at one end to said plate structure and extending along said outside of said motor toward the other end thereof;
   (d) a first mounting member fastened to the other ends of said support elements, said first mounting member being spaced from said motor and having a mounting shaft adapted to be fastened to a stationary object;
   (e) a second mounting member positioned adjacent said plate structure and having a mounting shaft adapted to be fastened to said stationary object;
   (f) drive gears mounted on said plate structure and being operatively connected to said drive shaft;
   (g) an elongated cylindrical drum surrounding said motor, said plate structure, and said first and second mounting members, said cylindrical drum being mounted for rotation on said mounting shafts of said first and second mounting members;
   (h) and means operatively connecting said drum with said drive gears so that said drum rotates with said drive gears.

2. An improved drive arrangement for a conveyor belt drum comprising:
(a) an electric motor having first and second ends spaced along an axis;
(b) a gear structure fastened to said second end of said motor, said gear structure being operatively connected to said motor and having an output gear;
(c) a plurality of support rods fastened at one end to said gear structure and extending therefrom along said motor with the other ends of said support rods positioned beyond said first end of said motor;
(d) a first mounting member fastened to said other ends of said support rods and spaced from said first end of said motor, said first mounting member including a first mounting shaft extending away from said motor along said axis;
(e) a gear plate having a plurality of gears mounted thereon, said gear plate being fastened to said gear structure and said gears being operatively connected to said output gear;
(f) a second mounting member positioned adjacent said gear plate, said second mounting member including a second mounting shaft extending away from said motor along said axis in an opposite direction relative to said first mounting shaft;
(g) a first end plate rotatably and concentrically mounted on said first mounting shaft;
(h) a second end plate rotatably and concentrically mounted on said second mounting shaft;
(i) a conveyor drum concentrically mounted on and fastened to said first and second end plates;
(j) and a ring gear mounted on said second end plate for operatively engaging said plurality of gears and supporting said second end plate.

3. The drive arrangement of claim 2 wherein said plurality of gears are symmetrically mounted around said output gear and said ring gear is mounted around said plurality of gears.

4. The drive arrangement of claim 3 wherein said first and second mounting shafts are concentric about said axis and are both arranged to be fastened to an object against rotation.

References Cited

UNITED STATES PATENTS

| | | | |
|---|---|---|---|
| 2,540,099 | 2/1951 | Christian | 74—421 |
| 2,736,209 | 2/1956 | Christian | 74—421 |
| 2,905,010 | 9/1959 | Rieser | 74—421 |
| 2,966,068 | 12/1960 | Christian | 74—421 |
| 3,005,357 | 10/1961 | Christian | 74—421 |
| 3,224,289 | 12/1965 | Palm | 74—421 |

DONLEY J. STOCKING, *Primary Examiner.*

LEONARD H. GERIN, *Examiner.*